United States Patent
Goetz et al.

(10) Patent No.: US 7,976,583 B2
(45) Date of Patent: Jul. 12, 2011

(54) OIL-, WATER- AND SOIL-REPELLENT PERFLUOROALKYLETHYL METHACRYLATE COPOLYMERS

(75) Inventors: Hans Goetz, Burghausen (DE); Florian Bauers, Muehldorf (DE); Wolfgang Knaup, Burgkirchen (DE)

(73) Assignee: Clariant Finance (BVI) Limited, Tortola (VG)

( * ) Notice: Subject to any disclaimer, the term of this patent is extended or adjusted under 35 U.S.C. 154(b) by 47 days.

(21) Appl. No.: 12/438,618

(22) PCT Filed: Aug. 20, 2007

(86) PCT No.: PCT/EP2007/058620
§ 371 (c)(1),
(2), (4) Date: Feb. 24, 2009

(87) PCT Pub. No.: WO2008/022985
PCT Pub. Date: Feb. 28, 2008

(65) Prior Publication Data
US 2009/0325849 A1    Dec. 31, 2009

(30) Foreign Application Priority Data
Aug. 25, 2006 (DE) .......... 10 2006 039 914

(51) Int. Cl.
*C11D 3/37* (2006.01)
*C08F 220/24* (2006.01)
*C08F 220/18* (2006.01)
*C08F 214/06* (2006.01)
*C08F 214/08* (2006.01)

(52) U.S. Cl. ........... 8/115.51; 8/133; 510/475; 526/245; 524/544

(58) Field of Classification Search .................. 510/475; 8/115.51, 133; 526/245; 524/544
See application file for complete search history.

(56) References Cited

U.S. PATENT DOCUMENTS

| | | | |
|---|---|---|---|
| 5,344,903 A * | 9/1994 | Raiford et al. | 526/245 |
| 6,437,077 B1 | 8/2002 | Danner | |
| 6,479,605 B1 * | 11/2002 | Franchina | 526/245 |
| 6,716,944 B2 | 4/2004 | Maekawa et al. | |

OTHER PUBLICATIONS

PCT International Search Report for PCT/EP 2007/058620, mailed Dec. 4, 2007.
PCT Written Opinion of the Internal Searching Authority for PCT/EP2007/058620, mailed Dec. 4, 2007.

* cited by examiner

*Primary Examiner* — Brian P Mruk
(74) *Attorney, Agent, or Firm* — Anthony A. Bisulca

(57) ABSTRACT

Short-chain perfluoroalkylethyl methacrylates copolymerized with vinyl chloride and/or vinylidene chloride, a $C_{12}$-$C_{22}$ alkyl (meth)acrylate and one or more thermally crosslinkable or isocyanate-reactive monomers are useful for oil-, water- and soil-repellent finishing of fibrous substrates under particularly mild conditions.

6 Claims, No Drawings

OIL-, WATER- AND SOIL-REPELLENT PERFLUOROALKYLETHYL METHACRYLATE COPOLYMERS

Fluorochemicals are often used as surfactants or wetting agents and are widely used for the surface treatment of substrates. They find frequent utility for the oil-, water- and soil-repellent finishing of fibrous substrates such as for example carpets, textiles, leather, nonwovens and paper and of hard substrates such as for example wood, metal or concrete. The imbibition of hydrophilic and hydrophobic liquids is reduced with substrates thus treated, and the removal of existing soils is promoted.

It is known from the literature that perfluoroalkyl (meth)acrylate copolymers based on monomers conforming to formula I $$R_F\text{-}CH_2CH_2OCOC(R)\text{=}CH_2 \quad (I)$$

with an $R_F$ perfluoroalkyl chain of 8 fluorinated carbon atoms are particularly useful for producing oil-, water- and soil-repellent coatings. When the $R_F$ perfluoroalkyl chain is shortened to 6 or 4 fluorinated carbon atoms, the oil-, water- and soil-repellent properties of the coatings worsen. This structure-property relation can be documented for example by means of contact angle measurements for water on coatings of the homopolymers on glass. The resulting critical surface tension increases from methacrylate to acrylate and also with increasing number of fluorinated carbon atoms.

It must accordingly be assumed that copolymers containing inter alia perfluoroalkylethyl (meth)acrylates having 8 fluorinated carbon atoms are more suitable than analogous compounds having fewer than 8 fluorinated carbon atoms for rendering textiles oil-, water- and soil-repellent. In fact, textile finishes are customarily based on copolymers containing monomers having a fully fluorinated carbon chain $R_F$ of 6 to 20 fluorinated carbon atoms. The perfluoroalkyl group here has an average chain length of 8 to 9 fluorinated carbon atoms.

A representative composition of perfluoroalkylethyl (meth)acrylates conforming to formula I is for example 11 to 17 wt % of a monomer having 6 fluorinated carbon atoms 48 to 52 wt % of a monomer having 8 fluorinated carbon atoms 18 to 22 wt % of a monomer having 10 fluorinated carbon atoms 1 to 15 wt % of a monomer having 12 or more than 12 fluorinated carbon atoms.

Customary textile finishes as described above, however, require high temperatures during the application of the finish and after each wash to achieve good oil-, water- and soil-repellent effects.

By incorporating monomers conforming to formula I having an $R_F$ perfluoroalkyl chain of 4 to 20 fluorinated carbon atoms with the average chain length of the perfluoroalkyl group being 6 to 7 fluorinated carbon atoms, the corresponding perfluoroalkylethyl (meth)acrylate copolymers provide good repellency effects even at low finishing temperatures. To this end, U.S. Pat. No. 5,344,903 claims inter alia the following composition for the perfluoroalkylethyl (meth)acrylate:

25 to 70 wt % of a monomer having 6 or fewer fluorinated carbon atoms 20 to 40 wt % of a monomer having 8 fluorinated carbon atoms 5 to 25 wt % of a monomer having 10 fluorinated carbon atoms 0 to 15 wt % of a monomer having 12 or more than 12 fluorinated carbon atoms.

The '903 patent specifies compositions of the same monomers that respectively have a "low distribution" and a "middle distribution". However, all the compositions described include monomers having a linear perfluoroalkyl chain of 8 fluorinated carbon atoms.

However, fluorous (i.e. fluorine-containing) compounds having a linear perfluoroalkyl chain of 8 fluorinated carbon atoms, including the above-described monomer compositions, can degrade under certain conditions to form perfluorooctanecarboxylic acid. These degradation products are considered not further degradable and therefore are persistent. Moreover, these compounds are suspected of accumulating in living organisms.

It is an object of the present invention to use fluoromonomers which do not contain a linear perfluoroalkyl chain of 8 fluorinated carbon atoms to prepare fluorous copolymers which, in a surface treatment of fibrous substrates with an effective amount of the fluorous aqueous dispersion, modify the surface to be highly oil-, water- and soil-repellent.

It has now been found that, surprisingly, mixtures of perfluoroalkylethyl methacrylates conforming to formula II $$R_F\text{-}CH_2CH_2OCOC(CH_3)\text{=}CH_2 \quad (II)$$

where $R_F$=4 and 6, copolymerized with vinyl chloride and/or vinylidene chloride, a $C_{12}$-$C_{22}$-alkyl (meth)acrylate and one or more thermally crosslinkable or isocyanate-reactive monomers lead to oil-, water- and soil-repellent coatings which are particularly environment compatible and also have high efficiency and durability after a low-temperature aftertreatment without any need for the presence of a linear perfluoroalkyl chain of 8 fluorinated carbon atoms.

The invention accordingly provides copolymers containing, based on the total weight of the copolymer:

a) 40 to 97 wt %, preferably 45 to 90 wt % of a perfluoroalkylethyl methacrylate mixture, b) 1 to 50 wt %, preferably 5 to 30 wt % of a $C_{12}$-$C_{22}$ alkyl (meth)acrylate and c) 0.5 to 10 wt %, preferably 1 to 5 wt % of one or more thermally crosslinkable or isocyanate-reactive monomers, and d) 1.5 to 50 wt %, preferably 4 to 30 wt % of vinyl chloride and/or vinylidene chloride.

The perfluoroalkylethyl methacrylate mixture a) has the following composition:

1 to 70 wt % of monomers conforming to formula II with 4 fluorinated carbon atoms 30 to 99 wt % of monomers conforming to formula II with 6 fluorinated carbon atoms.

Particular preference is given to the following perfluoroalkylethyl methacrylate mixtures:

"High Distribution"

1 to 10 wt % of monomers conforming to formula II with 4 fluorinated carbon atoms 90 to 99 wt % of monomers conforming to formula II with 6 fluorinated carbon atoms "Low Distribution"

30 to 70 wt % of monomers conforming to formula II with 4 fluorinated carbon atoms 30 to 70 wt % of monomers conforming to formula II with 6 fluorinated carbon atoms.

Most preference is given to the perfluoroalkylethyl methacrylate mixture of high distribution, since it provides superior oil-, water- and soil-repellency values on fibrous materials coupled with good environmental compatibility.

The comonomer b) is constituted by a $C_{12}$-$C_{22}$-alkyl (meth)acrylate. Preference is given to the following commercially available acrylate and methacrylate esters and also their mixtures: lauryl, myristyl, cetyl, stearyl, behenyl. Particular preference is given to the corresponding acrylate esters. Most preference is given to cetyl acrylate, stearyl acrylate and behenyl acrylate.

The comonomer c) contains one or more crosslinkable groups. A crosslinkable group is a functional group capable of entering a reaction with the substrate and/or with a further polyfunctional compound added. Such crosslinkable epoxy groups, groups can be: carboxylic acid groups, ethylenically unsaturated groups, hydroxyl groups, amino groups, N-alkylolamide groups, isocyanate groups or protected isocyanate groups. Examples of comonomers having one or more crosslinkable groups include unsaturated carboxylic acids and anhydrides of acrylic acid, methacrylic acid, α-chloroacrylic acid, crotonic acid, maleic acid, fumaric acid and itaconic acid, monomers including a hydroxyl group, for example 2-hydroxyethyl (meth)acrylates and hydroxypropyl (meth)acrylates, hydroxybutyl (meth)acrylate, 3-chloro-2-hydroxypropyl methacrylate, poly(ethylene glycol) mono (meth)acrylate, poly(propylene glycol) mono(meth)acrylate, poly(ethylene glycol)-co-poly(propylene glycol) mono (meth)acrylate, polytetrahydrofuran mono(meth)acrylate, N-hydroxymethyl(meth)acrylamide, hydroxybutyl vinyl ether. Further crosslinkable monomers are for example vinyl (meth)acrylate, allyl (meth)acrylate, N-methoxymethylacrylamide, N-isopropoxy-methylacrylamide, N-butoxymethylacrylamide, N-isobutoxymethylacrylamide, glycidyl (meth) acrylate and α,α-dimethyl-m-isopropenylbenzyl isocyanate. Other examples are monomers which release isocyanates at elevated temperatures or under irradiation with light, examples being phenol-, ketoxime- and pyrazole-protected isocyanate-terminated alkyl (meth)acrylates.

Particular preference is given to the following compounds for use as a comonomer c): 2-hydroxyethyl methacrylate, hydroxypropyl methacrylate, 3-chloro-2-hydroxypropyl methacrylate, N-hydroxymethylmethacrylamide, N-butoxymethylacrylamide and glycidyl methacrylate. Most preference is given to 2-hydroxyethyl methacrylate, N-hydroxymethylmethacrylamide and glycidyl methacrylate.

The comonomer (d) is vinyl chloride and/or vinylidene chloride. Vinylidene chloride is particularly preferred.

The copolymer described hereby is typically prepared by a free radical polymerization technique, for example by solvent, emulsion, microemulsion or miniemulsion polymerization techniques. Variants of the emulsion polymerization are particularly preferred. The emulsion polymerization of the monomers takes place in the presence of water, surfactants and an optional organic solvent. The mixture can have been pre-emulsified before the polymerization, by means of a high pressure homogenizer or a similar apparatus. The polymerization is typically carried out at temperatures between 40° C. and 90° C. in the presence of a free radical initiator.

Various anionic, cationic, nonionic or amphoteric surfactants can be employed, alone or in combination. Examples of nonionic surfactants include poly(ethylene glycol)lauryl ether, poly(ethylene glycol)tridecyl ether, poly(ethylene glycol)cetyl ether, poly(ethylene glycol)-co-poly(propylene glycol)cetyl ether, poly(ethylene glycol)stearyl ether, poly(ethylene glycol)oleyl ether, poly(ethylene glycol)nonylphenol ether, poly(ethylene glycol)octylphenol ether, poly(ethylene glycol)monolaurate, poly(ethylene glycol)monostearate, poly(ethylene glycol)monooleate, sorbitan monolaurate, sorbitan monostearate, sorbitan monopalmitate, sorbitan monostearate, sorbitan monooleate, sorbitan sesquioleate, sorbitan trioleate, poly(ethylene glycol)sorbitan monolaurate, poly(ethylene glycol)sorbitan monopalmitate, poly(ethylene glycol)sorbitan monostearate, poly(ethylene glycol) sorbitan monooleate, poly(ethylene glycol)-co-poly (propylene glycol), polyglycerol fatty acid esters, polyether-modified silicone oils and perfluoroalkyl-ethylene oxide adducts. The amount of nonionic surfactant used ranges from 0.1 to 100 percent by weight, relative to the weight of the polymer.

Examples of the cationic surfactants in accordance with the invention are ammonium compounds based on saturated and unsaturated fatty acid amines, for example octadecylammonium acetate, dodecyltrimethylammonium chloride; ammonium compounds based on amino-functionalized polyethoxylates and polypropoxylates and their interpolymers such as for example polyoxyethylene laurylmonomethylammonium chloride; ammonium compounds based on arylamines such as for example biphenyltrimethylammonium chloride, imidazoline derivatives such as for example ammonium salts formed from tallow and imidazoline; silicone-based cationic surfactants and fluorine-based cationic surfactants. The amount of cationic surfactant used ranges from 0.1 to 100 percent by weight relative to the weight of the polymer.

Examples of the anionic surfactants in accordance with the invention include fatty alcohol sulphates, for example sodium dodecylsulphate and poly(ethylene glycol)lauryl ether sulphate; alkylsulphonates such as for example sodium laurylsulphonate; alkylbenzenesulphonates, for example nonylphenol ether sulphates, sulphosuccinates, for example sodium hexyl diether sulphosuccinate; fatty alcohol phosphates, for example sodium laurylphosphate and fatty acid salts, such as for example sodium stearic acid salt. The amount of anionic surfactant used ranges from 0.1 to 100 percent by weight, relative to the weight of the polymer.

Examples of free radical initiators are organic or inorganic peroxides, azo compounds, organic and inorganic metal compounds and metals and also combinations thereof. Particular preference is given to azo compounds such as azobisisobutyronitriles (AIBNs), azobisvaleronitrile and azobis(2-cyanovaleric acid), 2,2'-azobis(2-amidinopropane)dihydrochloride; 2,2'-azobis[2-(2-imidazolin-2-yl)propane dihydrochloride; hydroperoxides such as cumene hydroperoxide, t-butyl hydroperoxide and t-amyl hydroperoxide, dialkyl peroxides such as di-t-butyl peroxide and dicumyl peroxide, peroxy esters such as t-butyl perbenzoate and di-t-butyl peroxyphthalate, diacyl peroxides, such as benzoyl peroxide and lauroyl peroxide; inorganic peroxides such as ammonium persulphate and potassium persulphate and also combinations of the specified compounds with organic or inorganic metal compounds and metals.

A chain transfer agent can be used in the polymerization, an example being an alkylthiol, in amounts of 0.01 to 5 wt %.

Examples of the organic solvent in the solvent and emulsion polymerization are: ketones such as for example acetone, methyl ethyl ketone and methyl isobutyl ketone; alcohols such as for example ethanol, isopropanol and butanol, polyalcohols such as for example 1,3-butanediol, 1,6-hexanediol, ethylene glycol, propylene glycol, dipropylene glycol, tripropylene glycol and glycerol; ethers and esters of polyalcohols, such as for example dipropylene glycol monomethyl ether, tripropylene glycol monomethyl ether, triethylene glycol dimethyl ether and diethylene glycol monobutyl ether acetate; esters such as for example ethyl acetate, propyl acetate, butyl acetate, dibutyl adipate and dibutyl succinate; hydrocarbons and halogenated hydrocarbons such as for example toluene, xylene, octane, perchloroethylene and 1,3-dichloro-2,2,3,3,3-pentafluoropropane.

The preferred solids content for the polymer dispersion prepared is between 10 and 50 weight percent.

The fluorous copolymers are suitable for coating fibrous substrates such as for example carpets, textiles, leather, nonwovens or paper or hard substrates such as for example wood, metal or concrete. They endow these substrates with water-, oil- and soil-repellent properties.

The invention thus also provides a process for surface treatment of fibrous substrates with an effective amount of the fluorous aqueous dispersion.

The content of the preparation for finishing textiles and other sheetlike structures in accordance with this invention is chosen so that sufficient repellent properties are transferred to the treated substrate. The wet pick-up was determined by weighing the finished specimens before and after application.

The fluorous textile-finishing agents according to the invention can be used together with other additives, including water-repellent materials, such as for example waxes, silicones, zirconium compounds or stearic acid salts, and also other oil-repellent materials, surfactants, insecticides, flame retardants, antistatic additives, plasticizers, dye fixatives and crease resist additives in an amount which does not impair fixing on the textile and the stability of the composition.

The fluorous textile-finishing agents according to the invention can be crosslinked by addition of reactive additives such as for example by protected isocyanates as described in U.S. Pat. No. 6,437,077 and the references cited therein. Other reactive additives used for this purpose can be melamine resins or epoxides.

The fibrous substrates to be coated with the fluorous polymeric dispersion are for example carpets, textiles, leather, nonwovens and paper. These consist inter alia of natural fibres such as for example cotton, linen and silk; of synthetic fibres such as for example polyamides, polyesters, polyurethanes, polyolefins, poly(meth)acrylates, poly(vinyl chlorides), poly(vinyl alcohols); semisynthetic fibres such as for example rayon or acetate; inorganic fibres such as for example glass fibres or ceramic fibres or any desired combination of the specified fibres or any desired combination of woven products composed of these materials.

For coating, the substrate is typically immersed in a dilute dispersion consisting of copolymer and optional additives. Alternatively, the dilute dispersion can be sprayed onto the substrate. The saturated substrate is subsequently pressed by a system of rolls to remove excess dispersion, dried in an oven and crosslinked at a temperature and for a time sufficient to achieve the desired repellent effects. This crosslinking process is typically carried out at a temperature of 20° C. to 190° C. with the preparation according to the invention, good repellent effects are obtained for the fibrous substrate without thermal aftertreatment. In order, however, to achieve better durability for the repellent effects, temperatures of about 120° C. to 180° C., in particular about 130° C. to 170° C. for a period of 5 seconds up to 10 minutes are necessary, preference being given to 5 seconds to 5 minutes.

A further alternative for applying the preparation to a substrate is foam application wherein the preparation is applied to the substrate as a foam which is then dried and crosslinked. For foam application, the preparation is typically added in a concentrated form which has been admixed with an additional foamer. A highly concentrated preparation for foam application typically contains the fluoropolymer in an amount of up to 20% by weight.

For the finishing on textiles, these can be examined in specific tests for their water-, isopropanol- and oil-repellent properties before and after washing.

Water repellency is determined by the spray test as per AATCC Standard Test Method 22. Distilled water is sprayed onto the textile substrate to be tested and a subsequent visual comparison of the pattern of wetting with reference pictures of an evaluation standard recited in the test method was used to generate a numerical value. The reported numerical values relate to the appearance of the surface after spraying with water and have the following connotation (Table 1):

TABLE 1

| Water repellency rating | Connotation |
| --- | --- |
| 100 | No clinging of water droplets or wetting of the upper surface |
| 90 | Occasional clinging of water droplets/wetting of the upper surface |
| 80 | Wetting of the upper surface at water impact points |
| 70 | Partial wetting of total upper surface |
| 50 | Complete wetting of total upper surface |
| 0 | Complete wetting of total upper and lower surfaces |

A second test with a series of water-isopropanol test solutions can be used to determine the isopropanol repellency (IPA) of a substrate. The reported IPA rating is the highest numbered test solution where the fabric is not wetted within 10 seconds and the drops still have the shape of a sphere or a hemisphere. Wetted substrates or substrates which are only repellent to 100% water (0% isopropanol), i.e. the least wetting test solution, are rated 0, whereas substrates which are repellent to 100% isopropanol (0% water) are rated 10. Intermediate ratings can be assigned as well.

Oil repellency as per AATCC Standard Test Method 118 tests the ability of a substrate to repel oily soiling, higher ratings in the assessment scale denoting better repellency of such soil, in particular of oily liquids. In the test, drops of standardized test liquids, consisting of a selected series of hydrocarbons having different surface tensions, are applied in succession to the surface of the specimen to be tested, by careful pipetting, and the wetting is visually assessed after a defined contact time. The oil repellency value corresponds to the highest numbered test liquid which causes no wetting of the surface. The standard test liquids have the following composition (Table 2):

TABLE 2

| Oil repellency | Composition |
| --- | --- |
| Rating 1 | Nujol ® |
| Rating 2 | 65 vol % of Nujol/35 vol % of n-hexadecane |
| Rating 3 | n-hexadecane |
| Rating 4 | n-tetradecane |
| Rating 5 | n-dodecane |
| Rating 6 | n-decane |
| Rating 7 | n-octane |
| Rating 8 | n-heptane |

Note: Nujol is a mineral oil from Plough Inc. having a Saybolt viscosity of 360/390 at 38° C. and a specific weight of 0.880/0.900 at 15° C.

Prior art fluorous copolymers are currently giving oil-repellency values of 6; however, a rating of 5 is usually already considered excellent.

EXAMPLES

The examples which follow illustrate the subject matter and advantages of the invention, but the materials and amounts cited in the examples shall not be viewed as limiting.

Materials:

FMA-6: a mixture of 95 wt % of perfluorohexylethyl methacrylate and 5 wt % of perfluorobutylethyl methacrylate FA-6a: a mixture of 95 wt % of perfluorohexylethyl acrylate and 5 wt % of perfluorobutylethyl acrylate
FA-6b: perfluorohexylethyl acrylate
FA-8: a mixture containing
   14 wt % of perfluorohexylethyl acrylate
   50 wt % of perfluorooctylethyl acrylate
   20 wt % of perfluorodecylethyl acrylate
   15 wt % of perfluorododecylethyl acrylate
FMA-46: a mixture of 33 wt % of perfluorohexylethyl methacrylate and 66 wt % of perfluorobutylethyl methacrylate
VC: vinyl chloride
VDC: vinylidene chloride
SA: stearyl acrylate
CA: cetyl acrylate
N-MAM: N-methoxymethylacrylamide
HEMA: 2-hydroxyethyl methacrylate
HEA: 2-hydroxyethyl acrylate
PEPM: polyethylene glycol-polypropylene glycol monomethacrylate

Example 1

Preparation of a Dispersion for Textile Finishing

The dispersion was prepared by intensively stirring the following components under an inert-gas atmosphere in an autoclave equipped with stirrer, reflux condenser and internal thermometer:
   60.0 g of 2-perfluorohexylethyl methacrylate
   22.5 g of stearyl acrylate
   15.5 g of vinylidene chloride
   1.0 g of N-methoxymethylacrylamide
   1.0 g of hydroxyethyl methacrylate
   30.0 g of dipropylene glycol
   0.5 g of dodecanethiol
   4.0 g of lauryl alcohol/16 ethylene oxide adduct
   3.5 g of N,N-dimethyldodecylammonium acetate
   200.0 g of water
The emulsion was heated to 60° C. and 0.6 g of the initiator 2,2'-azobis-2-amidinopropane dihydrochloride was added.

The polymerization time was 6 hours at 60° C. After the reaction, the excess of vinyl chloride was distilled off. The resulting dispersion had a solids content of about 33%. For finishing textiles, the dispersion was acidified and diluted to 30 g/l.

The dispersion was applied to fibrous substrates on an HVF 59301 laboratory pad-mangle from Mathis AG (Switzerland) followed by drying and heat treatment at 50° C. and 160° C./30 seconds in an LTE laboratory dryer from Mathis AG (Switzerland). The commercially available textile Sahara 530306 from NEL GmbH, Neugersdorf, was used as polyester/cotton 65/35 substrate to compare the applications. The wet pick-up was about 66% for all examples recited. The washing/drying procedure included 5 wash cycles at 60° C. The corresponding pieces of fabric were made up with ballast fabric to a wash load of one kilogram. The amount of laundry detergent needed was 7 g of "Coral intensive" per wash cycle. The fabric pieces were not dried between the wash cycles. After washing, the laundry was dried in a laundry dryer.

The dispersion of Example 1 was also applied to other fabrics such as for example polyester, cotton, polypropylene and polyamide. The correspondingly finished fabrics exhibited a similar effect level.

Examples 2 to 7 and Comparative Examples A, B, C

The textile-finishing dispersions were prepared similarly to Example 1. The monomer quantities are reported in Table 3.

Comparative Example D

Comparative Example D conforms to the recipe of Example 4 in U.S. Pat. No. 6,716,944. However, this recipe did not provide the water- and oil-repellency values disclosed in the patent. The monomer quantities are reported in Table 3.

The results of isopropanol repellency (IPA), oil repellency (oleo) and water repellency (hydro) for the dispersions of Examples 1 to 7 and Comparative Examples A, B, C & D are reported in Table 3.

TABLE 3

Preparation, application and testing of dispersions for textile finishing

| | | Amount of monomer in polymer (in wt %) | | | | | | |
|---|---|---|---|---|---|---|---|---|
| | Monomer | 1 | 2 | 3 | 4 | 5 | 6 | 7 |
| | FMA-6 | 60.0 | — | 60.0 | 60.0 | 60.0 | — | 60.0 |
| | FMA-46 | — | 60.0 | — | — | — | 60.0 | — |
| | FA-6a | — | — | — | — | — | — | — |
| | FA-6b | — | — | — | — | — | — | — |
| | FA-8 | — | — | — | — | — | — | — |
| | SA | 22.5 | 22.5 | 22.5 | — | 22.5 | 22.5 | 22.5 |
| | CA | — | — | — | 22.5 | — | — | — |
| | VC | — | — | 15.5 | — | — | 15.5 | 8 |
| | VDC | 15.5 | 15.5 | — | 15.5 | 7.5 | — | 7.5 |
| | N-MAM | 1.0 | 1.0 | 1.0 | 1.0 | 1.0 | 1.0 | 1.0 |
| | HEMA | 1.0 | 1.0 | 1.0 | 1.0 | 1.0 | 1.0 | 1.0 |
| | HEA | — | — | — | — | — | — | — |
| | PEPM | — | — | — | — | — | — | — |
| | Curing at [° C.] | 50 160 | 50 160 | 50 160 | 50 160 | 50 160 | 50 160 | 50 160 |
| Prior to washing | IPA | 70 90 | 40 60 | 70 100 | 50 80 | 70 80 | 60 80 | 70 100 |
| | Oleo | 5 6 | 4 5 | 5 6-7 | 4-5 6 | 5 6 | 4-5 5-6 | 5 6-7 |
| | Hydro | 100 100 | 90 90 | 90 100 | 90 90-100 | 100 100 | 80-90 100 | 100 100 |

TABLE 3-continued

Preparation, application and testing of dispersions for textile finishing

| After 5 washes | IPA | — | 90 | — | 60 | — | 90 | — | 70 | — | 60 | — | 60 | — | 90-100 |
|---|---|---|---|---|---|---|---|---|---|---|---|---|---|---|---|
| | Oleo | — | 6 | — | 5 | — | 6 | — | 5-6 | — | 5-6 | — | 4-5 | — | 6 |
| | Hydro | — | 100 | — | 80-90 | — | 90 | — | 80-90 | — | 90-100 | — | 80-90 | — | 100 |

| | | Amount of monomer in polymer (in wt %) | | | |
|---|---|---|---|---|---|
| Monomer | | A | B | C | D* |
| FMA-6 | | — | — | 69.0 | — |
| FMA-46 | | — | — | — | — |
| FA-6a | | — | 60.0 | — | — |
| FA-6b | | — | — | — | 38.6 |
| FA-8 | | 60.0 | — | — | — |
| SA | | 22.5 | 22.5 | 29.0 | 58.1 |
| CA | | — | — | — | — |
| VC | | — | — | — | — |
| VDC | | 15.5 | 15.5 | — | — |
| N-MAM | | 1.0 | 1.0 | 1.0 | — |
| HEMA | | 1.0 | 1.0 | 1.0 | — |
| HEA | | — | — | — | 1.9 |
| PEPM | | — | — | — | 1.4 |
| Curing at [° C.] | | 50  160 | 50  160 | 50  160 | 50  160 |
| Prior to washing | IPA | 50  80 | 40  40 | 60  80 | 40  50 |
| | Oleo | 3-4  6 | 3-4  4 | 4  4 | 3  3-4 |
| | Hydro | 90  100 | 90  90 | 90  100 | 80-90  90 |
| After 5 washes | IPA | —  70-80 | —  40 | —  50 | —  50 |
| | Oleo | —  6 | —  3 | —  4 | —  3 |
| | Hydro | —  100 | —  70-80 | —  80 | —  80 |

*Composition conforms to Example 4 in U.S. Pat. No. 6,716,944

The invention claimed is:

1. A copolymer containing, based on the total weight of the copolymer:
   a) 40 to 97 wt % of a perfluoroalkylethyl methacrylate mixture,
   b) 1 to 50 wt % of a $C_{12}$-$C_{22}$ alkyl (meth)acrylate and
   c) 0.5 to 10 wt % of at least one thermally crosslinkable or isocyanate-reactive monomer, and
   d) 1.5 to 50 wt % of vinyl chloride and/or vinylidene chloride;
   wherein the perfluoroalkyl group of the perfluoroalkylethyl methacrylate conforming to the formula

   $R_f\text{-}CH_2CH_2OCOC(CH_3)\!\!=\!\!CH_2$ contains
   1 to 10 wt % of 4 or fewer fluorinated carbon atoms and 90 to 99 wt % of 6 fluorinated carbon atoms.

2. A compound according to claim 1, wherein the $C_{12}$-$C_{22}$ alkyl (meth)acrylate is selected from the group consisting of cetyl acrylate, stearyl acrylate behenyl acrylate and mixtures thereof.

3. A process for water-, oil- and soil-repellent finishing of a fibrous substrate comprising the step of contacting the fibrous substrate with at least one copolymer according to claim 1.

4. An aqueous mixture comprising the copolymer according to claim 1 and a mixture of protected isocyanates.

5. A process for water-, oil- and soil-repellent finishing of a fibrous substrate comprising the step of contacting the fibrous substrate with at least one aqueous mixture according to claim 4.

6. A copolymer according to claim 1 containing, based on the total weight of the copolymer:
   a) 45 to 90 wt % of a perfluoroalkylethyl methacrylate mixture,
   b) 5 to 30 wt % of a $C_{12}$-$C_{22}$ alkyl (meth)acrylate and
   c) 1 to 5 wt % of at least one or more thermally crosslinkable or isocyanate-reactive monomer, and
   d) 4 to 30 wt % of vinyl chloride and/or vinylidene chloride.

* * * * *